Dec. 24, 1968  W. G. BUCKNER  3,418,010
ATTACHING DEVICE
Filed Aug. 4, 1967
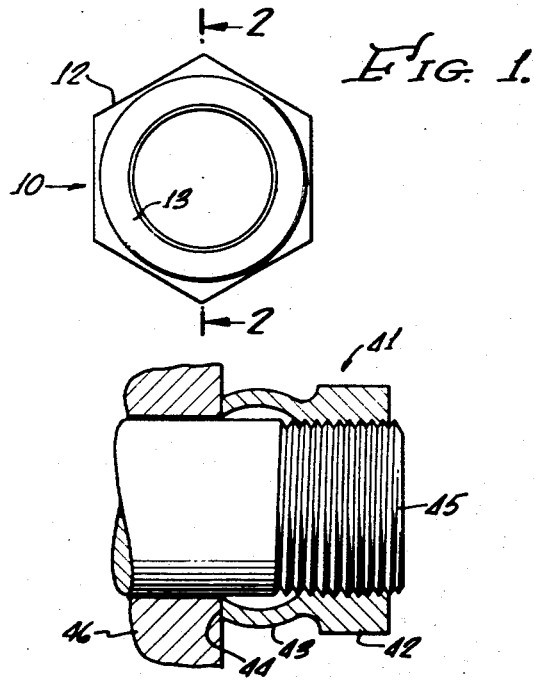
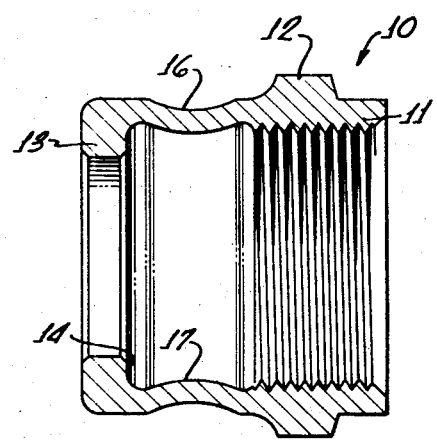
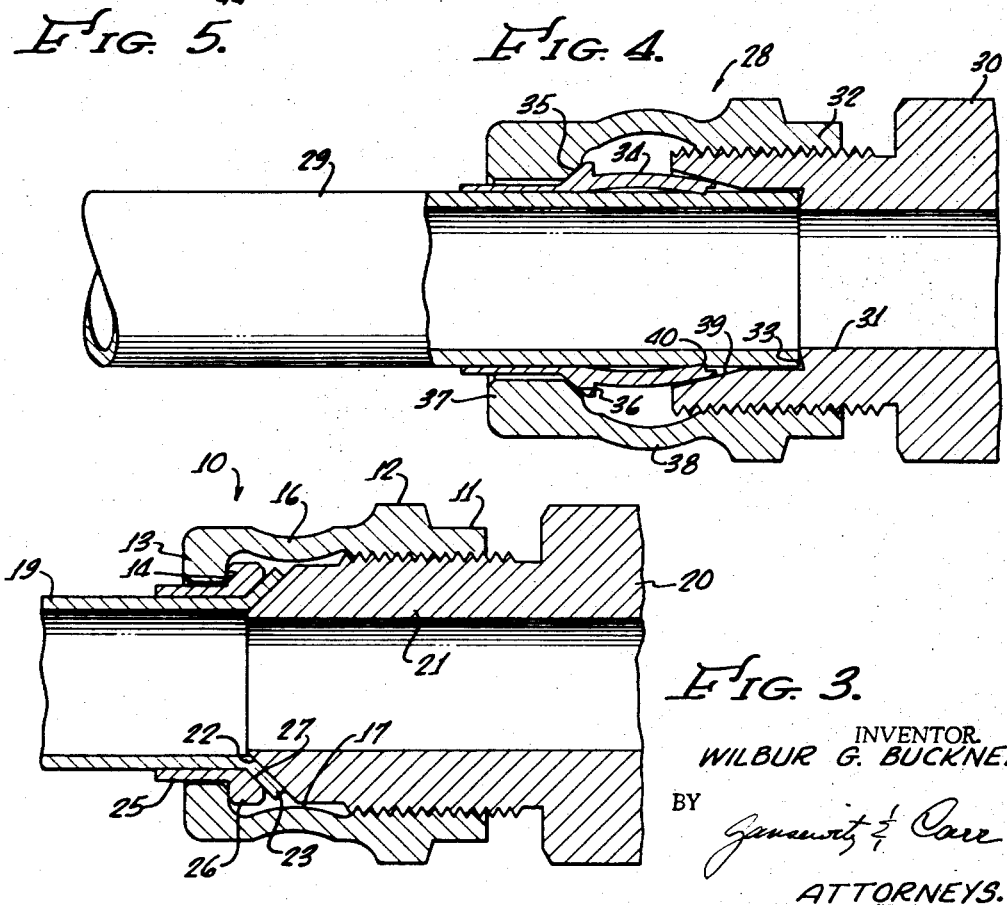
INVENTOR.
WILBUR G. BUCKNER
BY
ATTORNEYS.

United States Patent Office 3,418,010
Patented Dec. 24, 1968

3,418,010
ATTACHING DEVICE
Wilbur G. Buckner, Fallbrook, Calif., assignor to The Deutsch Company Metal Components Division, Los Angeles, Calif., a corporation of California
Filed Aug. 4, 1967, Ser. No. 658,506
9 Claims. (Cl. 285—92)

ABSTRACT OF THE DISCLOSURE

An attaching device to serve as a coupling for effecting a connection in a fluid system or as a compression member including a tubular element having an internally threaded portion at one end beyond which is a yieldable arcuate portion providing a resilience at the joint when the nut secures mating components.

BACKGROUND OF THE INVENTION

Field of the invention

This invention relates to a nut adapted for use as a coupling arrangement particularly for joining conduits in a fluid system, or as a compression nut with bolts and studs.

The prior art

In fluid systems, such as those for hydraulic fluid, the components frequently are coupled by conventional B-nuts. Typically, a flared tube end is held in engagement with the chamfered end of a mating fitting by means of an internal shoulder on a surrounding nut. This is to secure the components together and to effect a seal by holding the flared tube end tightly in engagement with the adjacent chamfered surface. In making up such systems, however, inevitably it is found that the components are not in precise alignment. Consequently, when the nuts are tightened, it is necessary to exert a clamping force adequate to distort some elements of the system sufficiently to allow the sealing faces to be brought into proper alignment where full annular engagement is accomplished. Only then will the joint be free of leaks. As a result, even though high loads usually are applied to such joints by the nuts, most of the force is dissipated in bending the parts to the correct positions, and only a small amount is applied to the mating faces where the seal is to be accomplished. Therefore, a fluid-tight seal may be difficult to obtain or easily lost during service conditions.

The conventional connection of this type results in a rigid joint which is particularly sensitive to the forces applied to it. These include various external forces and vibrational loads applied to the system, as well as loading caused by fluid pressure changes and thermal shock. Any of these can result in failure of the seal at the fluid joint. Moreover, unless the nuts are locked against rotation by suitable means, such as safety wiring, they may loosen as a consequence of the imposition of such external forces.

SUMMARY OF THE INVENTION

The present invention provides an arrangement for coupling together fluid conduits that includes a body having a resilient arcuate portion instead of the rigid wall of conventional designs. This is in the form of a tubular portion contoured to be concave or convex on its exterior side. This portion is interposed between an internally threaded section at one end and an inwardly directed shoulder at the other, which are used to hold the parts together when the device is in service. The nut also is usable as a compression member with a bolt or stud, in which event the inwardly directed shoulder may be eliminated.

The resulting construction has many advantages compared with previous practices. The resilient section will be deflected as the nut is tightened, and easily corrects the minor misalignment of the components of the fluid system. Hence, there is no difficulty in drawing the parts into tight sealing engagement, as any necessary bending for sealing alignment takes place at the nut instead of in the fluid lines and fittings. Nearly all the tensile loading on the nut is used productively in compressing together the sealing faces, and none in distorting the fluid lines as the resilient section deflects as needed. By contrast, only a small fraction of the tensile load is so used in the conventional design where the system components first must be deflected to bring the sealing faces into alignment before the faces can be forced together to accomplish a leakproof joint. As a consequence, the present invention provides a vastly improved seal. At the same time, although flexure is permitted at the nut, tensile strength exists that is comparable to that of a conventional nut.

The arcuate portion of the nut acts as a spring that elongates slightly as the nut is tightened. This preloads the arcuate portion of the nut which, because of its spring effect, is stressed considerably beyond the tensile load. The arcuate portion becomes more flexible because of this to enhance its ability to hold the sealing faces in contact and to provide uniform loading about the periphery of the threads.

The resilient portion permits loads to be absorbed and softened without affecting the seal. Shocks and vibration are taken out without damage to the coupling or the fluid lines. The nut, with its threads loaded uniformly around the periphery, does not loosen as the system is used, but actually becomes tighter under extreme service conditions. Thus, the device of this invention has a fully adequate tensile load capability, is less susceptible to fatigue, and possesses a longer life without maintenance than fluid coupling or fastening arrangements of the prior art.

An object of this invention is to provide an improved threaded fastening device.

An additional object of this invention is to provide an improved arrangement for effecting a joint for the conduit of a fluid system.

Another object of this invention is to provide a coupling nut device resulting in an improved seal in a fluid line.

A further object of this invention is to provide a coupling nut device that will hold mating parts in sealing engagement without requiring distortion of the components of the fluid system.

A still further object of this invention is to provide a coupling nut device that will hold fluid conduit parts in sealing engagement under all service conditions.

Yet another object of this invention is to provide an attaching device that will absorb and cushion loads in a system, and has a longer life than attaching devices of conventional design.

An additional object of this invention is to provide a threaded fastening device not adversely affected by vibrational or other loads, but which will become more securely tightened under service conditions.

These and other objects will become apparent from the following detailed description taken in connection with the accompanying drawing.

BRIEF DESCRIPTION OF THE DRAWING

FIGURE 1 is an end elevational view of the coupling nut device of this invention;

FIGURE 2 is a longitudinal sectional view taken along line 2—2 of FIGURE 1;

FIGURE 3 is a longitudinal sectional view of the device in use interconnecting components in a fluid system;

FIGURE 4 is a view comparable to FIGURE 3, but illustrating the device as used in connecting flareless tubing; and FIGURE 5 is a longitudinal sectional view of the invention employed as a compression member in conjunction with a bolt.

DESCRIPTION OF THE PREFERRED EMBODIMENTS

As seen in FIGURES 1 and 2 of the drawing, the coupling nut 10 of this invention is a unitary tubular member that includes at one end an internally threaded portion 11 having a hexagonal exterior section 12 for rotation by a wrench. At the opposite end, the nut 10 includes a radially inwardly directed flange 13 providing a shoulder 14 facing the hollow interior of the nut. Intermediate the end portions of the nut is a tubular wall 16, which is arcuate, tapering to a smaller diameter at its central portion. In longitudinal section, the wall 16 may have a circular curvature. Hence, this wall section is defined by a section of a torus.

Preferably, the wall 16 initially is formed as a straight cylindrical section. Following this, it is engaged by rollers and given the arcuate contour. This working of the material in the rolling operation increases its strength, and the section 16 is thereby made stronger than if initially machined to its arcuate configuration. The minimum diameter of the wall 16 at its center 17 normally is not made less than the minimum diameter of the threads at the end section 11 of the nut. This is to allow adequate clearance when the nut 10 is assembled with a flared tube in making up a joint.

The nut is illustrated in connecting a tube 19 to a fitting 20 in FIGURE 3. The fitting 20 incudes an externally threaded portion 21 which is received within the section 11 of the nut 10. The fitting 20 includes a beveled end 22 which is engaged by the outwardly flared portion 23 at the end of the tube 19. The end portion of the tube 19 is circumscribed by a sleeve 25 having a radially outwardly extending flange 26. This flange includes a beveled surface 27 that bears against the outer side of the flared portion 23 of the tube 19. Consequently, the tightening of the nut 10 exerts a force through the shoulder 14 of the nut flange 13, pressing inwardly against the flange 26 of the sleeve 25, which, in turn, forces the flared end 23 of the tube 19 against the beveled end surface 22 of the fitting 20. A seal is accomplished between the surface 22 and the flare 23.

The resulting connection provides a fluid-tight joint superior to that obtained with conventional coupling nut devices. There is no difficulty in obtaining a firm annular engagement between the tube end and the end of the fitting, as the portion 16 of the nut 10 will readily deflect to accommodate misalignment of the axes of the tube and the fitting. Therefore, as the nut 10 is tightened onto the section 21 of the fitting 20, nearly all the clamping force becomes employed in holding the mating faces together where the seal is to take place, rather than attempting to distort the components of the fluid system to force them into alignment.

The arcuate nature of the wall 16 provides the effect of a yiedable shock-absorbing element to cushion loads imposed upon the system during service. This includes vibrational forces and impacts from various causes, which are readily dissipated in the curved nut section 16 without breaking the seal or causing damage to any of the components. Stresses are distributed generally uniformly in the wall section 16, leading to an improved ability to absorb shock loading. The nut aligns itself with forces applied to the fluid system, and uses its strength in withstanding these loads rather than in reshaping the contours of the components. The load is equalized around the contacting faces of the joint, and the load remains substantially constant throughout a broad range of temperatures. The ability to yield under applied forces results in a resistance to fatigue and a longer life than that possible with conventional rigid connections. Vibrational and other loads do not cause the nut to loosen, but instead actually have the effect of causing the nut to become more tightly engaged on the fitting.

The nut of this invention is usable in connecting flareless tubing as well as the flared tubing described above. As shown in FIGURE 4, the nut 28 is employed in joining a tube 29, which has a straight end section, to a fitting 30. The latter element includes an externally threaded portion 31 that is received within the end section 32 of the nut 28. An internal shoulder 33 in the fitting 30 is engaged by the end edge of the tube 29. The sleeve 34 that circumscribes the tube 29 includes an external tapered shoulder 35 which is engaged by an inclined wall 36 of the nut at its end flange 37. The forward end of the sleeve 34 is contacted by the tapered internal surface 39 of the fitting 30.

The wall 38 of the nut between the flange 37 and the internally threaded part 32 is in the form of a shallow outward convolution. It is made convex on the exterior in order to provide a clearance around the end of the threaded portion 31 of the fitting 30. This assures that there will be no interference between the nut and the fitting, and that the arcuate portion of the nut will be free to flex as required.

As the nut is tightened onto the fitting, the sleeve 34 becomes bowed and its forward inner corner is caused to dig into the periphery of the tube 29. This connects the tube to the fitting and accomplishes a seal. The arcuate wall section 38 of the nut affords the same advantages as the corresponding portion in the arrangement for flared tubes described above. Again, the nut provides a semirigid connection and can yield sufficiently at the arcuate portion to allow loads to be dissipated without harming the seal effected between the sleeve 34 and the periphery of the tube 29. The resulting connection provides improved performance and is of longer life than conventional arrangements.

In FIGURE 5, the invention is shown serving as a compression element rather than a tension member for coupling conduits together. The nut 41 is generally similar to the nut 28 of FIGURE 4. Thus, it includes an internally threaded portion at one end provided with a hexagonal periphery 42 for engagement by a wrench. Projecting beyond the threaded portion is a convex, arcuate section 43 defining a portion of a torus. The arcuate portion 43 terminates in a substantially radial end edge 44. The inturned flanges of the previously described designs are omitted.

In the embodiment illustrated in FIGURE 5, the nut 41 is threaded onto the end of a bolt 45, bringing the end 44 of the nut into engagement with the workpiece 46. The arcuate section 43, by being convex outwardly, clears the surface of the bolt 45 and is not restricted from flexing. When used in this manner, the nut serves as a fastening element with the bolt or with a stud instead of coupling tubing to a fitting. The arcuate portion, as before, provides a spring effect, being this time in compression instead of tension. It is stressed as the nut is tightened and deflected so as to shorten the overall length of the nut slightly. The resilient section 43 provides the nut 41 with an ability to align with the load, resistance to shock, an equalization of loads around the periphery of the thread and other advantages of the previously described embodiment. Thus, the device of this invention provides an improved result either as a tension member in a coupling device or as a compression element in a fastening arrangement.

The foregoing detailed description is to be clearly understood as being given by way of illustration and example only, the spirit and scope of this invention being limited solely by the appended claims.

I claim:

1. A coupling device comprising a tubular member, one end of said tubular member having internal threads therein, an inwardly directed flange on the opposite end of said member, and an arcuate resilient elongated tubular portion interconnecting said flange and said threaded portion, said resilient portion being arcuate in longitudinal cross section, said resilient portion being curved inwardly and tapers to a portion of minimum diameter intermediate the ends thereof, said resilient portion having substantially the same diameter at either end thereof.

2. A device as recited in claim 1 in which said resilient portion is defined by a segment of a torus.

3. A coupling device comprising
a tubular member,
   one end portion of said member having an internal thread thereon,
      the exterior of said end portion including drive surface means for engagement by a driving tool for rotating said member,
   a radially inwardly extending flange at the opposite end of said member,
      said flange including a shoulder facing the interior of said member,
   and a resilient portion interconnecting said threaded portion and said opposite end,
      said resilient portion being concave exteriorly and defined by a toroidal segment,
         said segment having a minimum diameter no less than the minimum diameter of said threaded portion,
      said resilient portion having substantially the same diameter at either end thereof.

4. An attaching device comprising
a tubular member having
   an internally threaded portion,
   and an arcuate portion projecting from said internally threaded portion,
      said arcuate portion being resilient and curved in longitudinal cross section,
      said arcuate portion including an end portion having a surface for engagement with an adjoining part,
      said arcuate portion having substantially the same diameter at either end thereof.

5. A device as recited in claim 4 in which said arcuate portion is defined by a section of a torus.

6. A device as recited in claim 4 in which said arcuate portion is curved outwardly having a portion of maximum diameter intermediate the ends thereof.

7. A device as recited in claim 6 in which said surface for engaging an adjoining part comprises a substantially radial outer edge at the distal end of said arcuate portion, said radial edge having an inside diameter no less than the minimum diameter of said threaded portion.

8. A device as recited in claim 4 in which said surface for engaging an adjoining part comprises an inwardly directed flange at the distal end of said arcuate portion.

9. A device as recited in claim 4 in which said threaded portion includes exterior surface means for engagement by a wrench for rotating said tubular member.

References Cited

UNITED STATES PATENTS

| | | | |
|---|---|---|---|
| 1,674,562 | 6/1928 | Mueller et al. | 285—354 |
| 2,323,912 | 7/1943 | Johnson | 285—354 |
| 2,544,108 | 3/1951 | Richardson | 285—341 |
| 3,023,033 | 2/1962 | Koch | 285—423 |

CARL W. TOMLIN, *Primary Examiner.*

WAYNE L. SHEDD, *Assistant Examiner.*

U.S. Cl. X.R.

285—341, 354; 85—14